Oct. 27, 1936.　　　　R. G. AREY　　　　2,058,939
INDICATING INSTRUMENT
Filed Sept. 20, 1932　　　　2 Sheets-Sheet 1
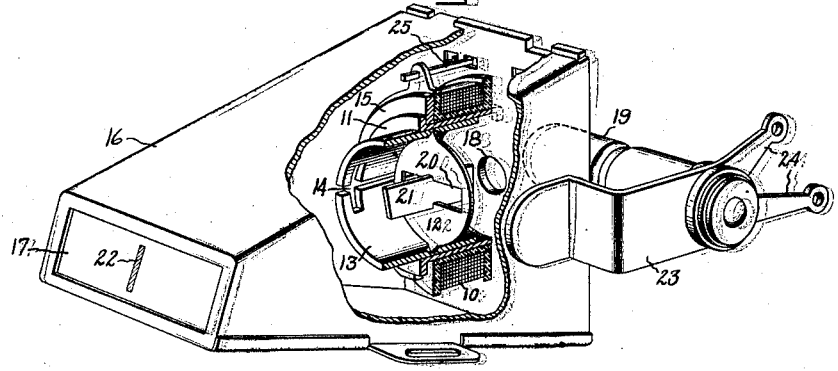
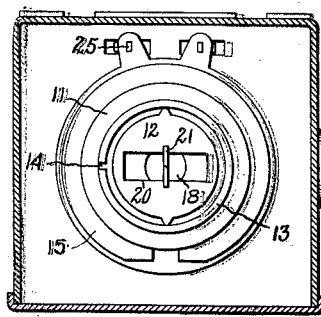
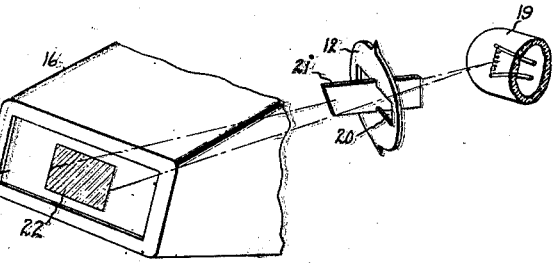
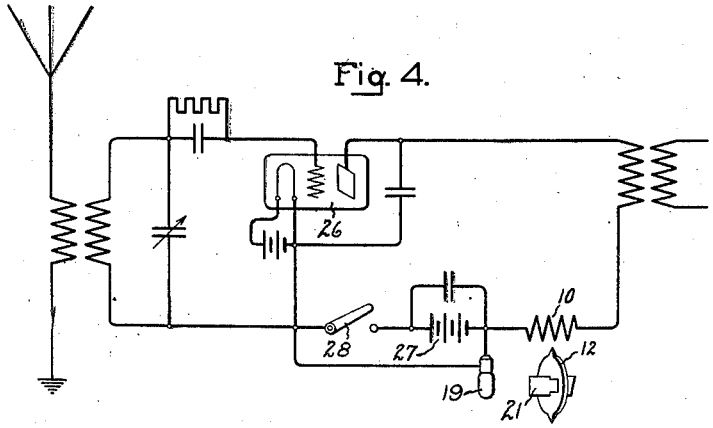
Inventor:
Ralph G. Arey,
by Chas. V. Tullar
His Attorney.

Oct. 27, 1936.   R. G. AREY   2,058,939
INDICATING INSTRUMENT
Filed Sept. 20, 1932   2 Sheets-Sheet 2

Inventor:
Ralph G. Arey,
by *Charles E. Tullar*
His Attorney.

Patented Oct. 27, 1936

2,058,939

UNITED STATES PATENT OFFICE 2,058,939

INDICATING INSTRUMENT

Ralph G. Arey, Swampscott, Mass., assignor to General Electric Company, a corporation of New York Application September 20, 1932, Serial No. 633,983

11 Claims. (Cl. 177—311)

My invention relates to indicating instruments, and is particularly useful in connection with tuning instruments to give a visual indication of the process of tuning and of the tuned condition when obtained. Certain aspects of the invention, however, are generally applicable to various other uses.

An important aspect of my invention relates to improvements in instruments comprising an indicating mechanism, a light source and a translucent screen, between which is placed shutter means actuated by the movable element of the measuring instrument and arranged to cause a shadow effect on the screen. The indication is produced by a change in the size, form, or position of the shadow as the shutter mechanism is turned or moved. A wide variety of shadow effects may be obtained by changes in the size and shape of the shutter and the character of its movement, and the extent of the movement may be magnified to any desired extent by moving the shutter mechanism toward the light source.

In describing my invention, I will explain its use as a tuning indicator for a radio set, but I, of course, do not wish to limit my invention to any particular use.

The features of my invention which are believed to be novel and patentable will be pointed out in the claims appended hereto. For a better understanding of my invention, reference is made in the following description to the accompanying drawings, Fig. 1 of which shows a preferred form of radio tuning instrument embodying my invention; Fig. 2 shows a sectional view through the casing and a front view of the instrument contained therein; Fig. 3 illustrates the character of the indication obtained as the shutter is turned; Fig. 4 shows how my instrument may be included in the detector tube circuit of a radio set when used as a tuning instrument; Fig. 5 is a diagrammatic illustration of the invention as applied to a flow meter where the shutter is shaped as an arrow to show the direction as well as the rate of flow. Figs. 6, 7, and 8 illustrate the use of different forms of shutters and the character of the indication obtained by their use; Fig. 9 illustrates the instrument of my invention as provided with a pointer in place of a shutter; and Figs. 10 and 11 show how the scale distribution of such an instrument may be changed by varying the position of the armature with respect to the other parts.

Referring now to Figs. 1 to 3, inclusive, and particularly Fig. 1, the electrical instrument part of the device comprises a cylindrical coil 10, the supporting form of which is mounted on a tube 11 of brass or other non-magnetic material. A magnetic armature 12 is pivoted in a second tube 13 of brass or other non-magnetic material, the tube 13 telescoping into tube 11 and being longitudinally adjustable therein. The inner tube 13 may be split as indicated so as to expand slightly after insertion to insure a snug fit in the outer tube and prevent movement therein except when manually adjusted. The forward end of the tube 13 is preferably provided with openings 14 in its sides so that a screw-driver or other tool may be inserted to adjust the longitudinal or rotary position of tube 13 within tube 11 as desired.

At one end of the coil 10 and supported about tube 11 is a C-shaped permanent magnet 15. It will be evident that flux from this permanent magnet will tend to hold the magnetic armature 12 parallel to the plane of the magnet in the position indicated in Figs. 1 and 2 when no current is flowing in coil 10. If now a direct current be passed through coil 10 it will produce a flux along the cylindrical axis and the armature 12 will tend to turn in alignment therewith. The direction in which the armature turns will depend upon the direction of direct current flow through the coil, since the armature is polarized by the flux from the permanent magnet. The extent to which the armature turns from the crosswise position in the tube will of course depend upon the strength of the direct current, so that the rotary position of the armature becomes an indication of current direction and a measure of its strength.

This instrument is supported in a substantially light-tight casing 16 preferably darkened on its interior surface to cut down reflected light rays. The front of the casing is closed by a translucent screen 17, and the back of the casing contains a small opening 18 to pass the rays of a suitable light source, such as a small incandescent lamp 19. Light rays thus enter opening 18 and pass axially of the tube 13 towards screen 17. Armature 12 has a rectangular opening 20 across the central portion of its horizontal diameter, and at right angles to the armature and at the center of opening 20 there is secured a thin shutter 21. The relative size and positions of opening 18 and armature 12 and their positions with respect to the light source are such that armature 12 cuts off all light from screen 17 except that which passes through the window opening 20. The screen 17 is therefore normally illuminated except for the vertical central shadow line 22 cast by the shutter 21 standing parallel to the light rays. If now the armature 12 is turned, the shutter swings across the light passing through window 20 and the shadow 22 expands, as indicated in Fig. 3. Preferably, the shutter extends farther to the front than to the rear, so that the shadow 22 expands equally on both sides of the center line as the armature is turned. This is because the two ends of the shutter are at different distances from the light source and screen. The lamp 19 is shown supported from an arm 23 from the casing. This arm is preferably of thin material, so that it may be bent slightly to make slight adjustments of the position of the lamp, and the lamp is rotatable on its axis in its support so that the axis of the lamp filament and position thereof may be adjusted to facilitate proper focusing. The lamp leads are indicated at 24 and the leads to coil 10 are through conducting rods 25 supported between projections on the coil former and the rear of the casing. The casing is provided with suitable ears whereby it may be fastened into a radio receiving cabinet with the screen 17 visible through a front opening in such cabinet.

In Fig. 4, I have shown a portion of a radio receiving circuit, with the coil 10 of my tuning indicator connected in the output circuit of the detector tube 26. The lamp 19 of my instrument may be connected to the radio set supply source indicated at 27 so that when the set is turned on by closing switch 28 the light for the indicating system of the tuning instrument is also turned on.

It has been found that when such a radio circuit is properly tuned, the direct current component of the current flowing in the output circuit of the detector becomes a minimum and increases as I depart from a condition of resonance in either direction. The high frequency alternating current components in the detector circuit do not affect the direct current measuring instrument.

If therefore my instrument is connected as represented with its shutter 21 parallel to the light rays when the radio circuit is tuned, and is calibrated to respond to the increase in direct current in the radio circuit on either side of resonance, the width of the shadow 22 on screen 17 will increase in proportion to the departure from a tuned condition, and will in effect give a picture of the process of tuning and indicate the tuned condition when obtained. For example, if the tuning operation is carried from one side of resonance through resonance and then beyond in the opposite direction, the shadow on the screen will first approach a thin line and then grow wider again, thus giving a visual indication of the different degrees of tuning and will indicate the point where the tuning operation is carried beyond the desired condition of resonance. I have found that the visual effect thus obtained is very effective in obtaining exact and quick tuning. When used for this purpose, the instrument will be preferably included in the radio receiver cabinet and the light screen 17 will be seen at the front of the cabinet adjacent the dial used for tuning purposes.

In some radio receiving circuits, the direct current component in the plate circuit of the detector tube increases as a condition of resonance is approached, and when this is the case the shutter 21 will preferably be mounted so as to cast a thin line shadow on the center of the screen for full deflection of the instrument. The same visual indication of the tuning operation will result. For this purpose the part marked 12 should be made of non-magnetic material and the shutter 21 of magnetic material.

In Fig. 5, I have shown a conduit 30, in which it may be assumed that fluid flows in different directions at different times and at different rates. Shaft 31 is pivotally mounted in one side of the conduit and carries thereon a vane 32 extending into the central portion of the conduit. Shaft 31 is biased by suitable springs 33 so that vane 32 normally stands at right angles to the conduit. Shaft 31 also carries a shutter 34, which is shaped somewhat like an arrow, and it will be assumed that this shutter is parallel to vane 32. Now, when fluid flows in the conduit 30, it will rotate the shaft in one direction or the other, depending upon the direction of flow, and to an extent dependent upon the rate of flow, turning the shutter 34 accordingly. As previously explained, shutter 34 is mounted between the light source 19 and a translucent screen 35, and its shadow will be cast thereon as indicated. The screen may have a graduated scale marked thereon, as indicated, and calibrated with the instrument in rate of flow. As represented, the scale will have a zero center, with graduations in both directions therefrom. The shadow cast by shutter 34 will be a straight line at the center of the scale when the fluid in conduit 30 is not flowing, and the shadow will take the form of an arrow pointing in the direction of flow when the fluid in the conduit flows in either direction. The length of this shadow arrow will be a measure of the rate of flow, so that a person a considerable distance away can obtain a fairly exact indication of the direction and rate of flow even though he is unable to read the scale graduations thereon. It will be apparent that the extent to which the shadow is magnified in this and other modifications may be varied as desired; for example, if we move the light source 19 towards shaft 31, or if we move the translucent screen 17 away from shaft 31, we increase the length of the shadow for a given deflection.

Figure 5:
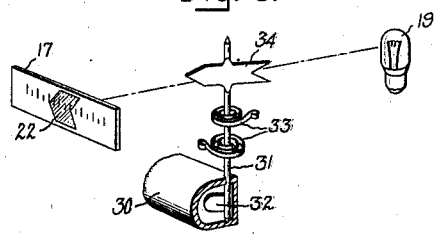
Figure 6:
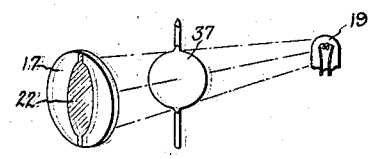
Fig. 6 shows a shutter in the form of a substantially circular disc, and the exposed portion of the translucent screen in the form of a circle. The resulting indication will vary from a line across the diameter of the exposed surface of the screen to an ellipse, which gradually spreads to the form of a circle as the shutter is turned from a position parallel to the light rays.
Figure 7:
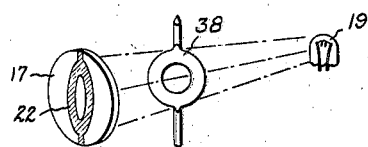
Fig. 7 represents substantially the same arrangement, except that the shutter 38 has a circular opening at its center, and we obtain a shadow effect somewhat resembling the pupil of an eye, which changes in size and shape as the shutter is turned.
Figure 8:
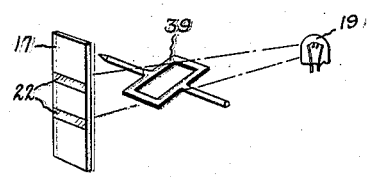

Fig. 8 represents a further modification of the shutter. The shutter 39 is of rectangular shape and contains a rectangular central opening, so that the shadow changes from a straight line at the center of the translucent screen to an indication of the form represented when the shutter is turned from a position parallel with the light rays. In this arrangement, two shadows are produced which increase in size as they move away from the center line.

Figure 9:
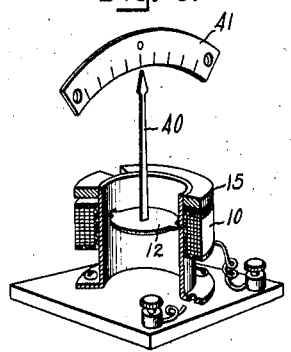
Figure 10:
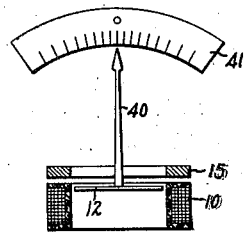
Figure 11:
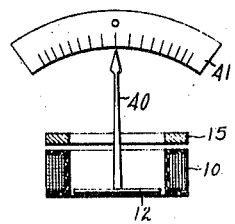

In Fig. 9, I have shown an electrical instrument substantially of the form used in the tuning instrument of Figs. 1 to 4, but provided with a pointer instead of the light ray indicating system. The pointer cooperates with a zero center scale 41, and by positioning the armature slightly above the center of the coil 10 and nearest the end towards the permanent magnet, the scale distribution will be substantially uniform. For this adjustment the coil and magnet are here slidable on the tubular armature support. If the armature is placed nearer the permanent magnet, as indicated in Fig. 10, the lower portion of the scale adjacent the zero point will be contracted with respect to the remainder thereof, and if the armature is placed near the opposite end of the coil, away from the permanent magnet, the lower central portion of the scale adjacent the zero point will be expanded with respect to the other portion, as indicated in Fig. 11. By placing the permanent magnet at the top it has a lifting tendency on the magnetic armature and to that extent relieves the weight and friction on the pivot bearings. By rotating the permanent magnet in a plane at right angles to the axis of the coil so that the air gap therein is nearer one pivot than the other, a further change in sensitivity and scale distribution may be obtained. Such a movement of the permanent magnet will vary the angular direction of the leakage flux from such magnet through the armature in a way to vary the turning moment thereon and it will also shift the leakage flux more or less to one side of the axis of rotation of the armature, tending to shift the zero point to one side or the other on the center of the scale if the armature and the permanent magnet are not in the same plane.

It is thus seen that the form of instrument shown in Figs. 1 to 4 and 9, 10 and 11 is easily adjustable for sensitivity, scale distribution, damping, etc.

The form of armature pivots used and shown preferably comprise sharpened points on extensions of the armature on opposite edges. These pivots rest in small cavities formed in the surrounding tubular shell 13, Fig. 1. The armature is inserted in the shell and the shell slightly compressed to slide into the tube 11, after which the armature pivots cannot be displaced. This gives a rugged, inexpensive armature mounting that will stand vibration and hard usage without injury.

Such changes in design as will occur to those skilled in the art without departing from the true spirit and scope of the invention disclosed are intended to be included within the scope of the appended claims.

What I claim as new and desire to secure by Letters Patent of the United States, is:

1. An instrument comprising a cylindrical coil, a C-shaped permanent magnet coaxial with the coil at one end thereof, a disc-shaped magnetic vane armature within said coil pivoted on a diametrical axis at right angles to and intersecting the axis of the coil, and a support for said armature adjustable axially with respect to the coil and permanent magnet, and means for supporting said parts in the relationship set forth.

2. An instrument comprising a cylindrical coil, a C-shaped permanent magnet coaxial with the coil at one end thereof, a circular magnetic vane armature within said coil pivoted to turn on a diametrical axis at right angles to and intersecting the axis of the coil, said permanent magnet being rotatively adjustable with respect to the axis of rotation of the armature in a plane at right angles to the axis of the coil, and means for supporting said parts in the relationship set forth.

3. An instrument comprising a cylindrical coil, a C-shaped permanent magnet coaxial with the coil at one end thereof, a circular magnetic vane armature pivoted for rotation within said coil on a diametrical axis at right angles to and intersecting the axis of the coil, means for adjusting said armature in the axial direction of said coil, said permanent magnet being rotatable with respect to the axis of rotation of the armature in planes at right angles to the axis of the coil, and means for supporting said parts in the relationship set forth.

4. An instrument comprising a cylindrical shaped coil, a C-shaped permanent magnet, a non-magnetic tubular member fitted within and supporting said coil and magnet in coaxial relation therewith, a second non-magnetic tubular member in telescoping relation within said first member, a circular disc-shaped magnetic vane armature pivoted at its edges in the second tubular member on an axis at right angles to and intersecting the axis of the coil within the influence of said coil and magnet, and means for indicating the rotative position of said armature.

5. An instrument comprising a vertical tubular non-magnetic supporting member, a magnetic armature pivoted within said supporting member with its axis of rotation at right angles to and intersecting the axis of the tubular member, a cylindrical coil surrounding and slidably mounted on the exterior of said supporting member, a C-shaped permanent magnet substantially surrounding and slidably mounted on the exterior of said supporting member above said coil, and means for indicating the rotative position of said armature as determined by the joint influences of said coil and magnet.

6. An instrument comprising a cylindrical coil, a C-shaped permanent magnet at one end and coaxial with said coil, a circular magnetic vane armature pivoted within said coil on an axis at right angles to the coil axis, said armature having an opening extending across the central portion thereof at right angles to its axis of rotation, a thin shutter across the center of the opening extending in opposite directions from the armature at approximately right angles to its surface, a light source on one side of said armature, a translucent screen on the opposite side of said armature so arranged that the shutter casts a thin line shadow across the center of the screen when the armature stands at right angles to the axis of the coil and as the armature is turned from said position, the shadow spreads substantially equally to both sides from the center of the screen, and means for supporting said parts in the relationship set forth.

7. An instrument comprising a cylindrical coil, a C-shaped permanent magnet coaxial with said coil, a light source and a translucent screen on opposite sides of said coil such that light may shine through the cylindrical coil onto said screen, a magnetic vane armature pivoted within said coil on an axis of rotation at right angles to the axis of the coil, said armature having a window in its center, the armature serving to cut off light between the light source and screen except that which passes through the window, a shutter across the center of said window serving to cast a shadow on said screen, which symmetrically varies from the center of the screen as the armature is turned, and means for supporting said parts in the relationship set forth.

8. An instrument comprising a cylindrical coil, a C-shaped permanent magnet coaxial with said coil, a magnetic vane armature within said coil pivoted on an axis of rotation at right angles to the axis of the coil within the influence of the coil and permanent magnet, a light source and a translucent screen on opposite sides of said armature, the armature serving to vary the amount of light which passes between the light source and screen as the armature is turned to produce an indication on the screen of the position of said armature, and means for supporting said parts in the relationship set forth.

9. A tuning instrument having an energizing coil and a rotatable armature biased to a neutral position within the influence of said coil but rotatable in opposite directions from said position in response to the magnitude and direction of direct current flowing in said coil, a light source, a translucent screen, shutter means rotated with said armature located between said light source and screen, said shutter being shaped and positioned to cast a shadow on said screen which shadow remains relatively stationary on said screen but which symmetrically varies in breadth as said armature is turned in either direction from a neutral position to thereby produce a visual indication of the process of tuning, and means for supporting said parts in the operative relationship set forth.

10. An instrument for use in tuning circuits to produce a visual indication of the process of tuning and the tuned condition comprising a direct current electrical measuring instrument having a pivoted armature, said armature being biased to a neutral position but rotatable in opposite directions therefrom in response to the magnitude and direction of direct current energization of said instrument, shutter means rotated with said armature, a light source and a translucent screen, between which said shutter means is located, said shutter being shaped and positioned to produce a shadow on said screen which shadow remains relatively stationary on said screen but expands in size as said armature is turned in either direction from a neutral position, and means for supporting said parts in said operative relationship.

11. A measuring instrument responsive to the direction and magnitude of an electric current, said instrument having a rotatable armature member biased to a central zero indicating position, which member is rotated in opposite directions from said position in response to the direction and magnitude of the current measured thereby, a light source, a translucent screen, and a shutter in the shape of an arrow located between said light source and screen and rotated with the rotatable member of said instrument, said arrow-shaped shutter having its longitudinal axis parallel to the light rays when the rotatable member is in a neutral position so as to cast a shadow effect upon said screen indicative of direction and magnitude when said member is rotated from its neutral position.

RALPH G. AREY.